(12) United States Patent  
Swenson

(10) Patent No.: US 8,800,256 B2  
(45) Date of Patent: Aug. 12, 2014

(54) TINE ADJUSTMENT FOR A HEADER

(75) Inventor: Kevin E. Swenson, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 159 days.

(21) Appl. No.: 13/336,145

(22) Filed: Dec. 23, 2011

(65) Prior Publication Data

US 2013/0160420 A1 Jun. 27, 2013

(51) Int. Cl.
*A01D 89/00* (2006.01)

(52) U.S. Cl.
USPC .............................. 56/364; 56/14.4

(58) Field of Classification Search
USPC ................... 56/14.4, 16.1, 364, 400
See application file for complete search history.

(56) References Cited

U.S. PATENT DOCUMENTS

| 2,162,506 A | 6/1939 | Jones et al. | |
|---|---|---|---|
| 2,175,088 A | 10/1939 | Oppenheim et al. | |
| 2,548,329 A * | 4/1951 | Van Sickle | 56/364 |
| 3,143,839 A | 8/1964 | Johnson | |
| 3,705,483 A * | 12/1972 | Jarrell et al. | 56/13.5 |
| 4,008,558 A * | 2/1977 | Mott | 56/226 |
| 4,464,890 A * | 8/1984 | Scholtissek et al. | 56/364 |
| 5,768,870 A * | 6/1998 | Talbot et al. | 56/364 |
| 2002/0108362 A1 | 8/2002 | Amaro et al. | |
| 2010/0293914 A1 | 11/2010 | Killen et al. | |
| 2013/0160418 A1 | 6/2013 | Sauerwein et al. | |

OTHER PUBLICATIONS

U.S. Appl. No. 13/336,064, filed Dec. 23, 2011 entitled "Support for Reel or Auger with Single Piece Tube".
U.S. Office Action dated Sep. 11, 2013 cited in U.S. Appl. No. 13/336,064, 15 pgs.

* cited by examiner

*Primary Examiner* — Alicia Torres

(57) ABSTRACT

An apparatus for adjusting tines of a header includes a reel lift arm, a reel comprising a plurality of tines, a tine adjustment ring, and an actuator. The reel is operatively connected to the reel lift arm. The tine adjustment ring is may be operatively connected to the reel and the plurality of tines. The actuator is operatively connected to the reel lift arm and the tine adjustment ring.

8 Claims, 3 Drawing Sheets

TINE ADJUSTMENT FOR A HEADER

CROSS-REFERENCE TO RELATED APPLICATIONS

The current application is related to U.S. patent application Ser. No. 13/336,064 filed on Dec. 23, 2011, entitled "Support for Reel or Auger with Single Piece Tube,", which is hereby incorporated by reference in its entirety.

BACKGROUND

Equipment such as, for example, agricultural machines, may have a reel to direct crops into the agricultural machines. The reel may have tines. The tines may assist in raking or sweeping the crops into the agricultural machines.

BRIEF DESCRIPTION OF THE DRAWINGS

The accompanying drawings, which are incorporated in and constitute a part of this disclosure, illustrate various embodiments of the disclosure. In the drawings.

DETAILED DESCRIPTION

Overview

Figure 1:
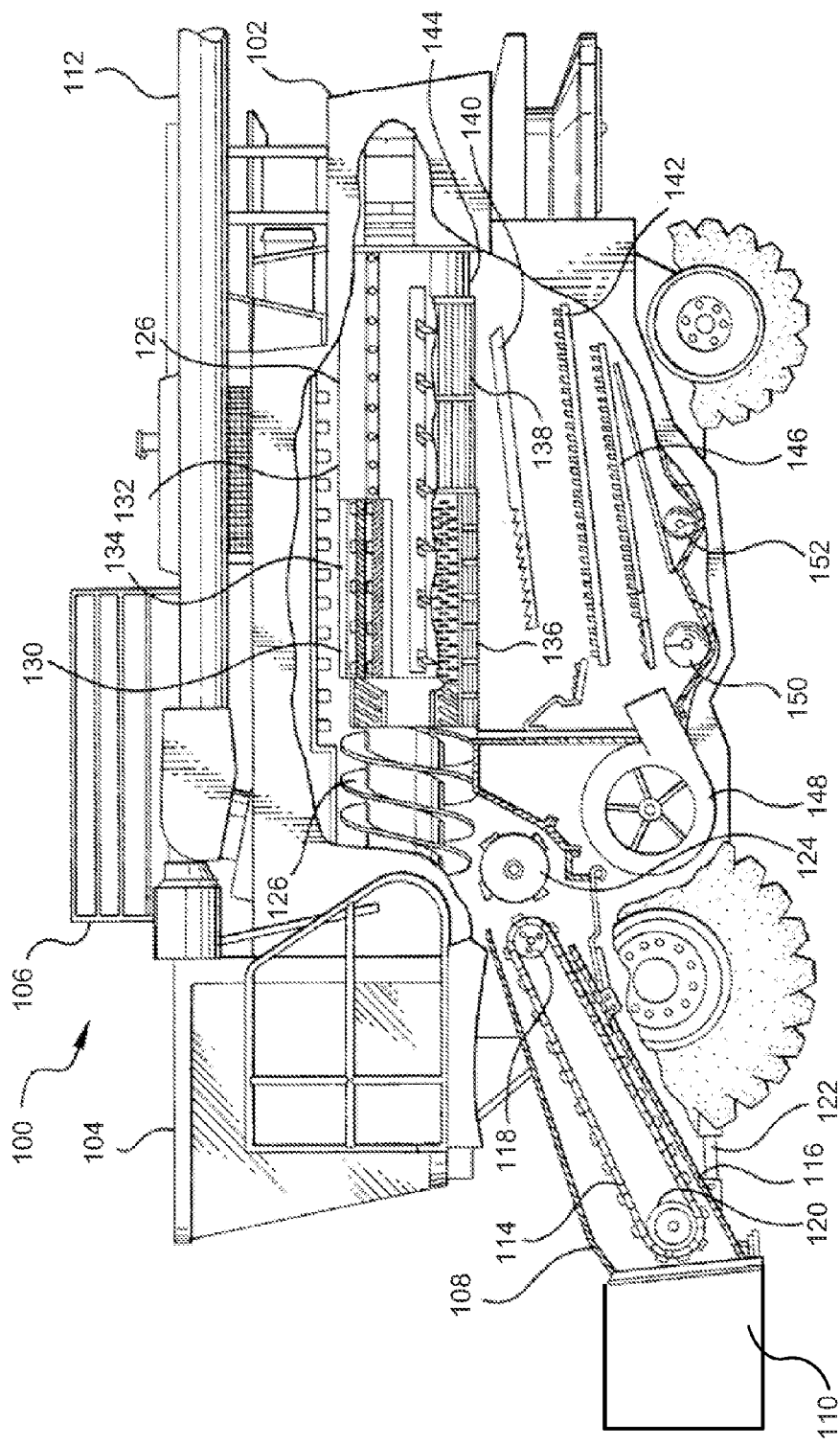
FIG. 1 is a diagram of a combine.

An apparatus for adjusting tines of a header may be disclosed. The apparatus may comprise a reel lift arm, a reel comprising a plurality of tines, a tine adjustment ring, and an actuator. The reel may be operatively connected to the reel lift arm. The tine adjustment ring may be operatively connected to the reel and the plurality of tines. The actuator may be operatively connected to the reel lift arm and the tine adjustment ring.

Both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

EXAMPLE EMBODIMENTS

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

A header may be connected to a combine, a swather, or other agricultural machines. The header may comprise a reel including a plurality of tines. The plurality of tines may be used to direct grain or other crops into the combine for harvesting. For example, the plurality of tines may be adjusted to assist in directing the grain or other crops into the combine.

FIG. 1 is a diagram of a combine 100. Combine 100 may comprise a separator housing 102, an operator's work station and cab 104, a grain tank 106, an elevator assembly 108, and a header 110. A swingable unloading auger assembly 112 may pivot to a position extending laterally outward to one side of combine 100 to unload grain tank 106. Unloading auger assembly 112 may swing inward to a storage position as shown in FIG. 1 when grain tank 106 is not being unloaded.

Elevator assembly 108 may have a conveyor 114 mounted in an elevator housing 116. Conveyor 114 may be trained around rear drive sprockets 118 and a front drum 120. Hydraulic linear actuators 122 may pivot elevator housing 116 to raise and lower the forward end of elevator housing 116.

Crop material may be fed to a feed beater 124 by conveyor 114 in elevator housing 116. Feed beater 124 may feed crop material to a separating rotor 126. Separating rotor 126 may comprise a feed section 128, a threshing section 130, and a separation section 132. Feed section 128 may move crop material in a spiral path about a generally horizontal fore and aft axis of rotation to separating rotor 126, toward threshing section 130. In threshing section 130, crop material may pass between a cylinder bar 134 and a concave 136 where grain may be threshed. Threshed grain, that is not separated by concave 136, may be separated in separation section 132 and may pass through a separation grate 138. A grain pan 140 may convey grain and chaff forward and may deposit it on a chaffer 142. Crop material other than grain (MOG) may be discharged from separating rotor 126 through a rotor discharge 144.

Grain and MOG that may pass through concave 136 and separation grate 138 may fall to upper grain pan 140. Grain pan 140 may convey grain and chaff forward and may deposit it on chaffer 142. The grain may be cleaned by chaffer 142 and a sieve 146 and air from a fan assembly 148. Chaff may be discharged from the rear of sieve 146 and chaffer 142. Clean grain may fall into a clean grain auger 150. The clean grain may be conveyed to grain tank 106 by clean grain auger 150 and an elevator (not shown). Tailings may fall into a returns auger 152 and may be conveyed to separating rotor 126 by returns auger and return elevators (not shown), where they may be threshed a second time.

Figure 2:
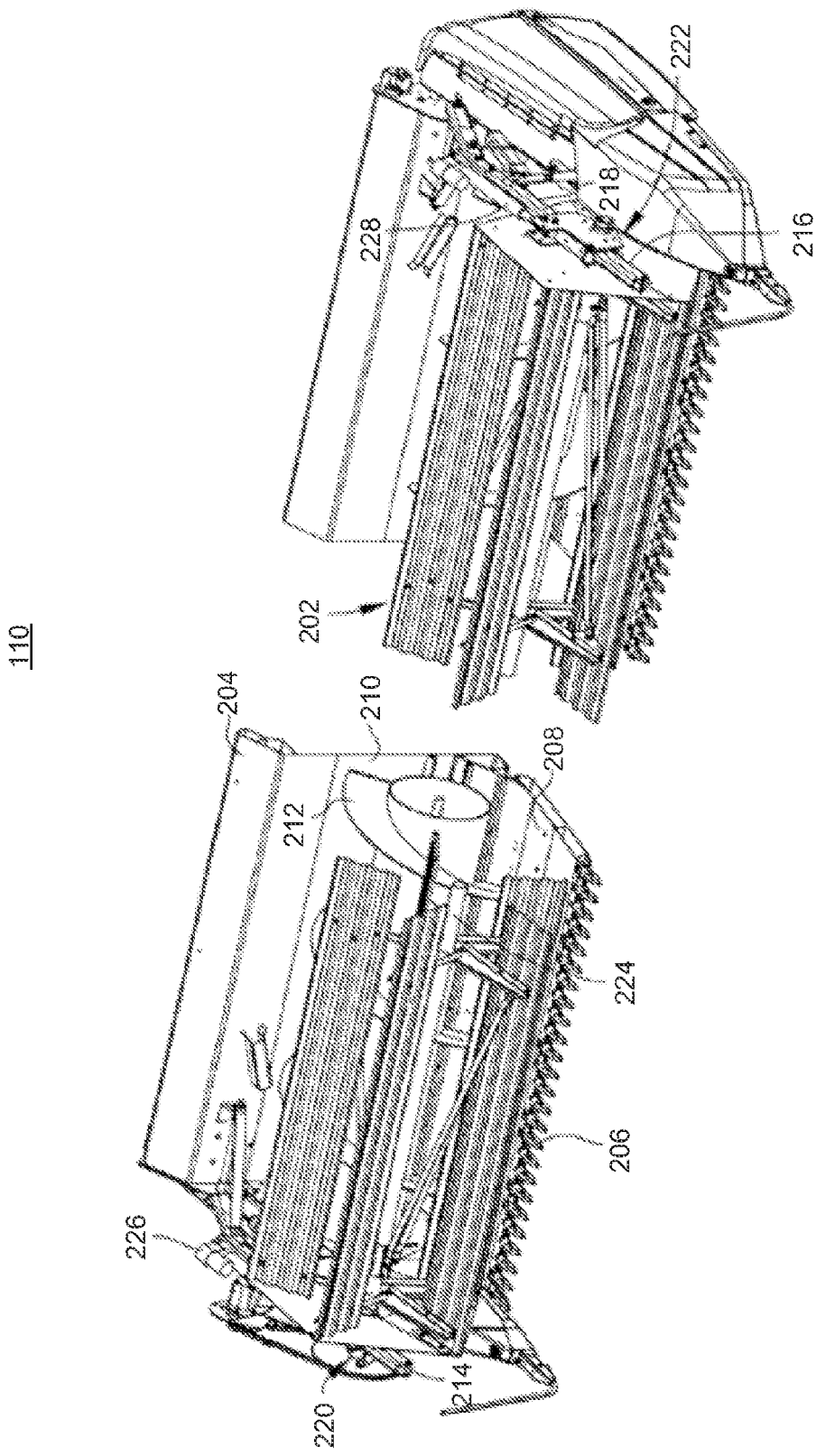
FIG. 2 is a diagram of a header.

FIG. 2 shows header 110 comprising a reel 202. Among other things, header 110 may comprise a frame 204 supporting a sickle assembly 206 across the lower front of header 110. A pan 208 may extend rearwardly from sickle assembly 206 to a generally upright rear wall 210. A center-gathering auger 212 may be located above pan 208 and forwardly of rear wall 210. Center-gathering auger 212 may convey crop material toward the center of header 110 for discharge into elevator assembly 108 of combine 100.

Reel 202 may be supported above pan 208 and in front of auger 212 by a pair of elongated, fore-and-aft extending, laterally spaced apart first reel lift arm 214 and second reel lift arm 216 adjacent opposite ends of header 110. First reel lift arm 214 and second reel lift arm 216 may be pivotally mounted at their rear ends to frame 204 at pivots (not shown) to enable reel 202 to be adjustably raised and lowered relative to pan 208 and sickle assembly 206. Hydraulic cylinders may interconnect first reel lift arm 214 (hydraulic cylinder 218) and second reel lift arm 216 (not shown) with frame 204 for effecting powered raising and lowering of first reel lift arm 214 and second reel lift arm 216 to adjust reel 202's height.

A first carrier assembly 220 and a second carrier assembly 222 may be provided on first reel lift arm 214 and second reel lift arm 216, respectively, for mounting opposite ends of reel 202 on first reel lift arm 214 and second reel lift arm 216 in a rotatable manner. First carrier assembly 220 may be adapted to support the drive for reel 202 while second carrier assembly 222 may have no such drive. In addition, first carrier assembly 220 and second carrier assembly 222 both may provide a driving force for reel 202. The driving force may be provided by second carrier assembly 222 instead of first carrier assembly 220.

First reel lift arm 214 and second reel lift arm 216 may have a first tine adjustment assembly 224 and second tine adjustment assembly 226, respectively. First reel lift arm 214 and second reel lift arm 216 may be located along a top edge thereof and may be operative to reposition reel 202. A reel 228 of reel 202 may be rotatably received at its opposite ends by first carrier assembly 220 and second carrier assembly 222.

Figure 3:
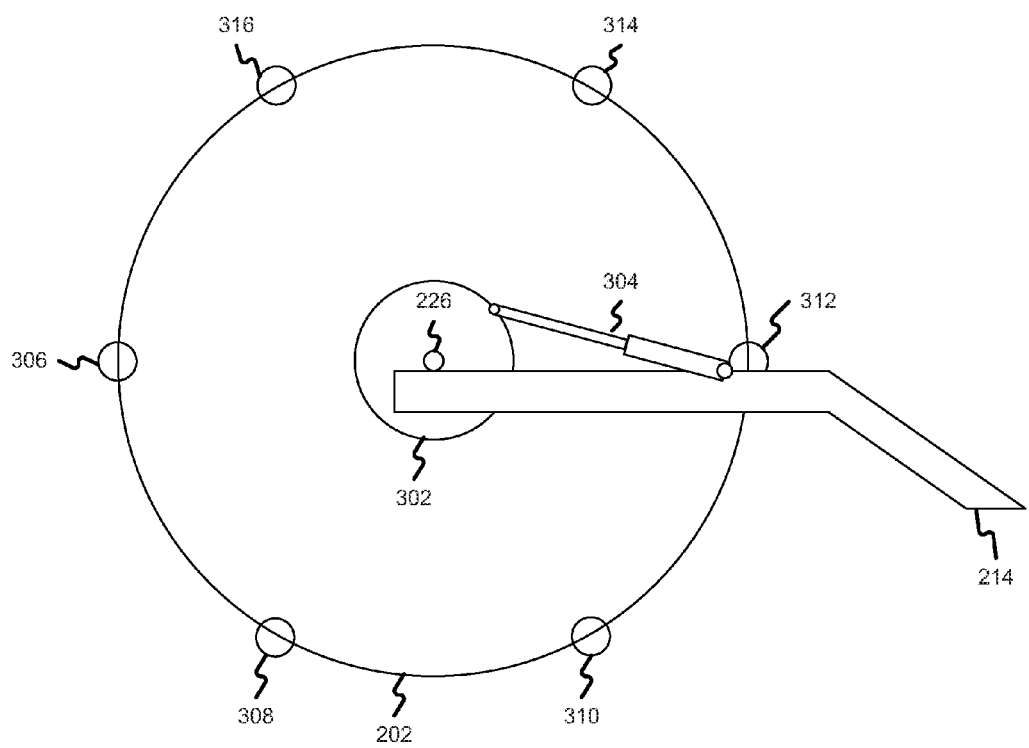
FIG. 3 is a schematic of a tine adjustment assembly.

FIG. 3 shows a schematic of first tine adjustment assembly 224. First tine adjustment assembly 224 may comprise first reel lift arm 214, reel 202, a tine adjustment ring 302, and an actuator 304. Reel 202 may be operatively connected to first reel lift arm 214. Tine adjustment ring 302 may be operatively connected to reel 202 and a plurality of tines. The plurality of tines may be comprised of a first set of tines 306, a second set of tines 308, a third set of tines 310, a fourth set of tines 312, a fifth set of tines 314, and a sixth set of tines 316. Actuator 304 may be operatively connected to first reel lift arm 214 and tine adjustment ring 302.

Actuator 304 may be configured to receive an input from combine 100. The input may be configured to cause a position of the plurality of tines to change. For example, the plurality of tines may be located in a first position and after receiving the input, actuator 304 may cause tine adjustment ring 302 to rotate. The rotation of tine adjustment ring 302 may cause the plurality of tines to relocate to a second position. The second position may result in the plurality of tines having a different angle of attack.

In addition, the input may be received from a user. The input received from the user may cause the plurality of tines to change positions. The input from the user, combine 100, or other sources may be received by actuator 304 in substantially real-time. In other words, the input may be received at actuator 304 while combine 100 is in operation so as to adjust the position of the plurality of tines depending on the ever changing operating environment and field conditions. For example, the input may be received at actuator 304 when the rotational speed of reel 202 changes. In addition, the input may be received at actuator 304 when the speed of combine 100 changes or the density of the crop being harvested changes.

A second actuator may be operatively connected to the plurality of tines via second tine adjustment assembly 226. For instance and as shown in FIG. 2, second tine adjustment assembly 226 may be located at an opposite end of reel 202 as first tine adjustment assembly 224. Second tine adjustment assembly 226 may be connected to different tines than first tine adjustment assembly 224. In addition, first tine adjustment assembly 224 and second tine adjustment assembly 226 may be connected to each set of tines.

For example, first tine adjustment assembly 224 may be operatively connected to first set of tines 306, third set of tines 310, and fifth set of tines 314. Second tine adjustment assembly 226 may be operatively connected to second set of tines 308, fourth set of tines 312, and sixth set of tines 316. First tine adjustment assembly 224 and second tine adjustment assembly 226 may be operative to adjust their respective sets of tines independent of one another. In other words, first tine adjustment assembly 224 may adjust the position of first set of tines 306, third set of tines 310, and first set of tines 314 without second tine adjustment assembly 226 adjusting the position of second set of tines 308, fourth set of tines 312, and sixth set of tines 316. In addition, first tine adjustment assembly 224 and second tine adjustment assembly 226 may be connect to first set of tines 306, second set of tines 308, third set of tines 310, fourth set of tines 312, fifth set of tines 314, and sixth set of tines 316. Thus, first tine adjustment assembly 224 and second tine adjustment assembly 226 may adjust all the tines at once.

An embodiment may comprise an apparatus. The apparatus may comprise a reel lift arm, a reel comprising a plurality of tines, a tine adjustment ring, and an actuator. The reel may be operatively connected to the reel lift arm. The tine adjustment ring may be operatively connected to the reel and the plurality of tines. The actuator may be operatively connected to the reel lift arm and the tine adjustment ring.

Another embodiment may comprise an apparatus. The apparatus may comprise an agricultural machine, a reel lift arm, a reel comprising a plurality of tines, a tine adjustment ring, and an actuator. The agricultural machine may include an inlet. The reel may be operatively connected to the reel lift arm. The tine adjustment ring may be operatively connected to the reel and the plurality of tines. The actuator may be operatively connected to the reel lift arm and the tine adjustment ring.

Yet another embodiment may comprise a method. The method may comprise: receiving an input at an actuator; and rotating a tine adjustment ring in response to the input received at the actuator. Receiving the input at the actuator and rotating the tine adjustment ring may occur in substantially real-time.

Both the foregoing general description and the following detailed description are examples and explanatory only, and should not be considered to restrict the invention's scope, as described and claimed. Further, features and/or variations may be provided in addition to those set forth herein. For example, embodiments may be directed to various feature combinations and sub-combinations described herein.

All rights, including copyrights, in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example embodiments.

What is claimed is:

1. An apparatus comprising:
   an agricultural machine comprising an inlet;
   a reel lift arm operatively connected to the agricultural machine;
   a reel operatively connected to the reel lift arm and located proximate the inlet, the reel comprising a plurality of tines;
   a tine adjustment ring operatively connected to the reel and the plurality of tines; and
   an actuator operatively connected to the reel lift arm and the tine adjustment ring, the actuator being configured to receive input from the agricultural machine indicating a rotational speed change of the reel and, in response to receiving the input, rotate the tine adjustment ring to thereby adjust a position of the tines.

2. The apparatus of claim 1, wherein the actuator operatively connected to the reel lift arm and the tine adjustment ring is configured to receive an input from a user, the input being configured to cause a position of the plurality of tines to change.

3. The apparatus of claim 1, wherein the actuator operatively connected to the reel lift arm and the tine adjustment ring is configured to receive an input in substantially real-time, the input being configured to cause a position of the plurality of tines to change.

4. The apparatus of claim 1, further comprising a second actuator operatively connected to the plurality of tines and a second tine adjustment ring.

5. The apparatus of claim 1, wherein the plurality of tines comprises a first set of tines and a second set of tines, the apparatus further comprising:
 a second tine adjustment ring operatively connected to the reel and the second set of tines, and
 a second actuator operatively connected to the reel lift arm and the second tine adjustment ring.

6. The apparatus of claim 5, wherein the actuator being operatively connected to the reel lift arm and the tine adjustment ring is configured to reposition the first set of tines without changing the position of the second set of tines.

7. The apparatus of claim 1, wherein the actuator operatively connected to the reel lift arm and the tine adjustment ring is configured to rotate the tine adjustment ring, the rotation of the tine adjustment ring being operative to change an angle of attack of the tines.

8. The apparatus of claim 1, wherein the actuator operatively connected to the reel lift arm and the tine adjustment ring is configured to rotate the tine adjustment ring in response to a rotational speed change of the reel.

\* \* \* \* \*